United States Patent [19]

Breitschwerdt et al.

[11] B 4,004,821

[45] Jan. 25, 1977

[54] DEVICE FOR THE RAPID DISENGAGEMENT OF A RETAINING SYSTEM IN VEHICLES

[75] Inventors: Werner Breitschwerdt; Heinz W. Knoll, both of Stuttgart, Germany

[73] Assignee: Daimler-Benz Aktiengesellschaft, Germany

[22] Filed: May 24, 1973

[21] Appl. No.: 363,565

[44] Published under the second Trial Voluntary Protest Program on March 30, 1976 as document No. B 363,565.

[30] Foreign Application Priority Data

May 31, 1972 Germany .......................... 2226389

[52] U.S. Cl. .............................................. 280/744
[51] Int. Cl.² ......................................... B60R 21/10
[58] Field of Search ................. 280/150 SB, 150 B; 180/82 C, 111, 112, 113, 114

[56] References Cited

UNITED STATES PATENTS

| | | | |
|---|---|---|---|
| 3,168,158 | 2/1965 | Schoeffler | 180/82 C |
| 3,194,582 | 7/1965 | Kutz | 280/150 SB |
| 3,311,188 | 3/1967 | Gutshall | 180/82 C |
| 3,727,944 | 4/1973 | Wize | 280/150 SB |
| 3,822,760 | 7/1974 | Lindblad | 280/150 SB |

*Primary Examiner*—Robert R. Song
*Attorney, Agent, or Firm*—Craig & Antonelli

[57] ABSTRACT

An installation for the rapid release of a retaining system in vehicles, especially in motor vehicles with a passive safety belt system, in which at least one actuating mechanism is provided at a readily accessible place of the vehicle body, by way of which a release of the safety belt system can be initiated from the outside of the vehicle.

12 Claims, 3 Drawing Figures

DEVICE FOR THE RAPID DISENGAGEMENT OF A RETAINING SYSTEM IN VEHICLES

The present invention relates to an installation for the rapid disengagement or release of a retaining system in vehicles, especially in motor vehicles with passive safety belt systems.

In vehicles which are equipped in such a manner, the safety belt system abuts automatically with a predetermined prestress against the body of the user during the closing of the associated door. By the use of a belt wind-up roller which is preferably coupled with a belt-force-limiter and is accommodated on the inside of the door, the user receives the freedom of movement necessary for reaching remotely located parts in the vehicle interior space in that the belt band is unwound by the belt roller. During a sudden, jerk-like load of the safety belt caused, for example, by a collision or impact accident, the belt roller, however, is blocked and when a precisely determined force just barely still tolerable by the user is exceeded, a lengthening or elongation of the belt takes place by means of the belt force limiter under energy absorption.

It may happen that during the course of an accident, for example, the electric power supply fails whereby with the opening of the door, the automatic loosening and guiding away of the safety belt remains absent. It is then extremely difficult for any helper to rapidly disengage the belt system.

Furthermore, it is possible that in the course of an accident a door becomes jammed, and the passenger who is seated next to this door cannot free himself. It is then necessary to carry out the rescue operation from the other vehicle side by way of the adjacent seat. Maximum speed is required during this operation by reason of the need for fast medical care and by reason of an eventual fire danger of the vehicle. However, for the most part, a considerable delay occurs due to the securely abutting belts which leads to a lessening of the survival chance on the part of persons injured in the accident.

It is the aim of the present invention to provide an installation, by means of which the passengers retained by a preferably passive safety belt system can be rapidly freed from the safety belts after an accident or during any other emergency so that a rapid rescue can take place. The construction of the installment should thereby be as simple as possible and as trouble-free as possible. Additionally, the subsequent installation should also be realized with simple means.

Consequently, an installation for the rapid disengagement or release of a retaining system in vehicles, especially in motor vehicles with a passive safety belt system is proposed in which, according to the present invention at least one actuating mechanism is provided at a readily accessible, protected place of the body, by way of which a release of the safety belt system can be initiated from the outside.

It is therefore within the scope of the present invention to provide a centrally arranged common actuating mechanism by means of which simultaneously the safety belts of all passengers can be released, or to coordinate an actuating mechanism of its own to each safety belt installation.

The transmission of the release command and/or of the release operation may thereby take place mechanically, electrically or with the use of an auxiliary force.

In a preferred embodiment of the present invention, the actuating mechanism cooperates with an external door handle which is operatively connected with a belt release mechanism consisting, for example, of a belt lock and which, upon exceeding a predetermined actuating force acting on the same initiates an unlatching of the belt disengaging or release mechanism.

According to a further feature of the present invention, the force opposing the unlocking operation of the belt release mechanism can be produced by a spring which is received by a shaft or shank of a linkage part operatively connected with the outer door handle and which is supported, on the one hand, at the head portion of the linkage part and, on the other, at a bracket fixed at the vehicle and serving as guidance for the shaft.

A simple transmission system can be produced if the bracket is connected with a bell crank which receives at one end the linkage part leading to the outer door handle and at the other end a Bowden cable that is operatively connected with the belt release mechanism.

In order that a disengagement or release of the safety belt does not take place with each stronger actuation of the door outer handle, it is appropriate if the actuating force necessary for unlatching the belt release mechanism amounts to about five times the actuating force necessary for the opening of the door.

Furthermore, it is of advantage if the Bowden cable engages at a spring-loaded latching pawl of the belt lock which can also be manually actuated in the sense of an unlocking of the belt release mechanism from the interior space by pressing-in a coordinated button.

With a safety belt system consisting, for example, of a seat belt and shoulder belt, one is able to get along in each case with one belt release mechanism if both belt strands are connected with each other in proximity to the point of displacement thereof by a loop and are loosely connected with an eyelet or ring.

Accordingly, it is an object of the present invention to provide an installation for the rapid disengagement of a retaining system in vehicles, especially of a safety belt system in motor vehicles, which avoids by simple means the aforementioned shortcomings and drawbacks encountered in the prior art.

Another object of the present invention resides in an installation for the rapid release of a safety belt system in motor vehicles, especially with a passive safety belt system, which permits a rapid release of the safety belts, particularly in case of accidents, thereby speeding up recovery operations of any injured passengers.

A further object of the present invention resides in an installation for the rapid release of a safety belt system in motor vehicles, especially of a passive safety belt system, which permits the fast freeing of the passengers after an accident or any other emergency so that the chances of survival are greatly increased.

Still another object of the present invention resides in an installation for the rapid release of a retaining system in vehicles, especially of a passive safety belt system in motor vehicles, which is simple in construction and substantially trouble-free.

Still a further object of the present invention resides in a system of the type described above which can also be installed subsequently into existing vehicles by simple means.

These and further objects, features and advantages of the present invention will become more apparent from the following description when taken in connection with the accompanying drawing which shows, for purposes of illustration only, one embodiment in accordance with the present invention, and wherein.

Figure 1:
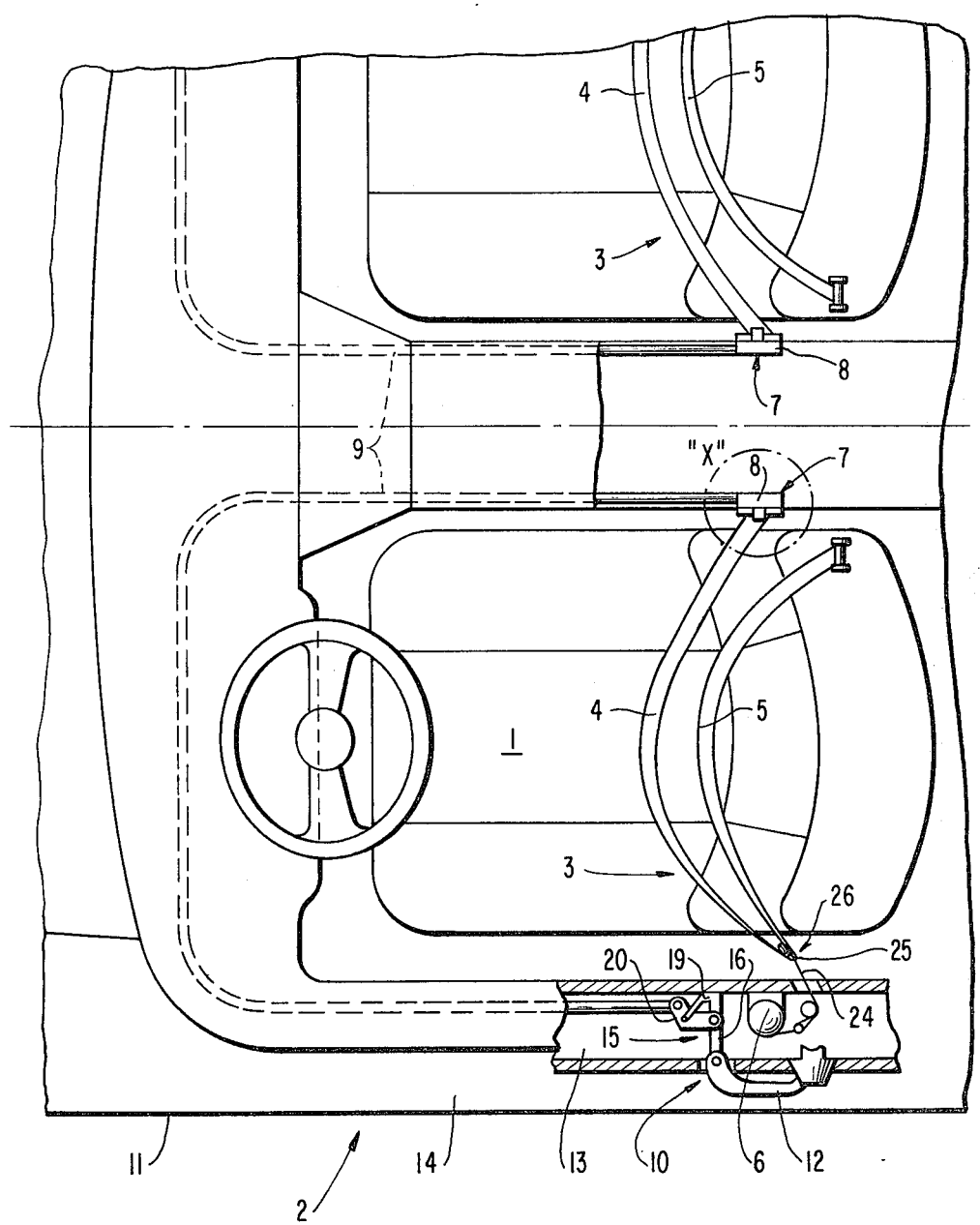
FIG. 1 is a simplified schematic plan view of a motor vehicle equipped with an installation according to the present invention.

Referring now to the drawing wherein like reference numerals are used throughout the various views to designate like parts, the motor vehicle generally designated by reference numeral 2 which is illustrated in somewhat greater detail in FIG. 1 within the area of the driver seat 1, is equipped with a passive safety belt system generally designated by reference numeral 3 which consists of a seat belt 4 and of a shoulder belt 5 and cooperates with a belt wind-up roller 6 provided with a belt force limiter (not shown). Since the belt wind-up roller 6 and the belt-force limiting device are of conventional construction, forming no part of the present invention, a detailed description thereof is dispensed with herewith. A belt release mechanism generally designated by reference numeral 7 which is constituted by a belt lock 8, is operatively connected with an actuating mechanism generally designated by reference numeral 10 by way of a Bowden cable 9. The actuating mechanism 10 may be arranged at a readily accessible, protected place of the body 11 but may also cooperate with a door outer handle 12—as illustrated in FIG. 1.

Figure 2:
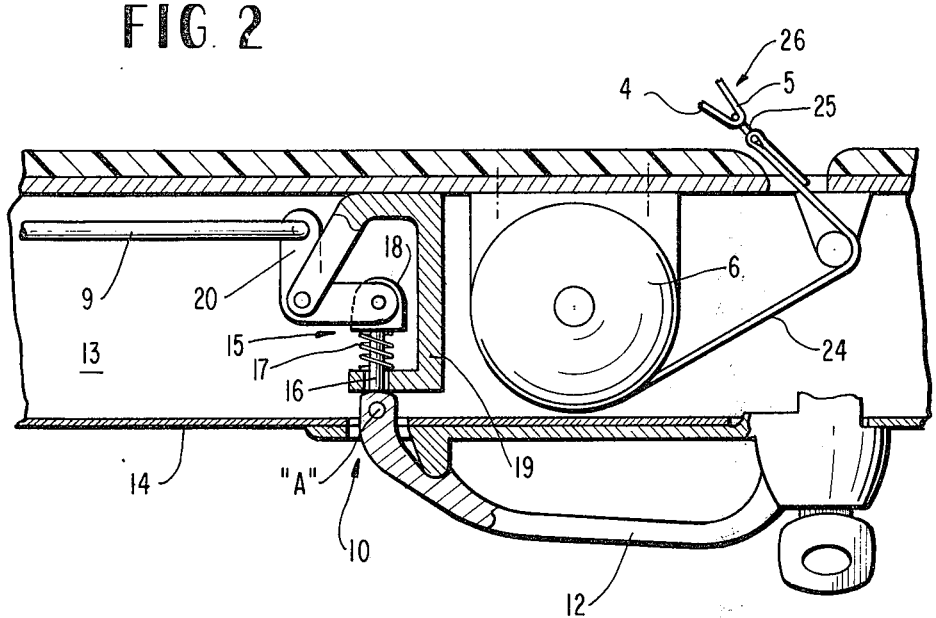
FIG. 2 is a partial somewhat schematic cross-sectional view, on an enlarged scale, of an actuating mechanism cooperating with a door outer handle according to FIG. 1.

This takes place in such a manner that a linkage generally designated by reference numeral 15 is provided in the hollow space 13 of the door 14—which also accommodates the belt wind-up roller 6—whose shaft 16 (as can be seen in particular from FIG. 2) is surrounded by a spring 17 which is supported, on the one hand, at the head portion 18 of the linkage part 15 and, on the other, at a bracket 19 fixed at the vehicle and serving as guide means for the shaft 16. The free end of the shank or shaft 16 is operatively connected with the door outer handle 12 so that upon actuation of the latter with a strong force, the spring 17 is compressed and the linkage part 15 is pulled in the direction of the door 14.

The bracket 19 is connected with a bell crank 20 which is operatively connected at one end with the linkage 15 leading to the door outer handle 12 and at the other end with the Bowden cable 9 which leads to the belt release mechanism 7.

Figure 3:
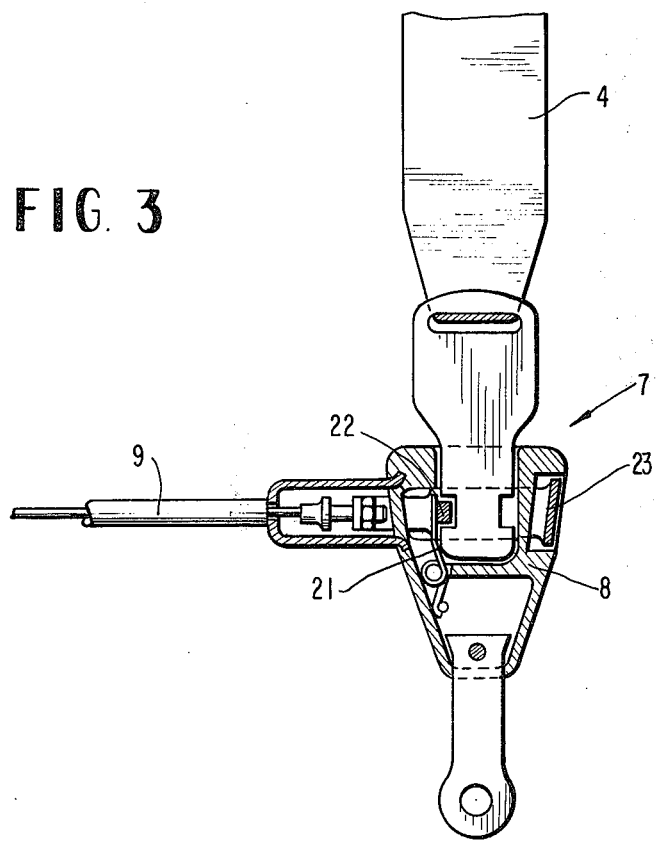
FIG. 3 is a partial cross-sectional view, illustrating on an enlarged scale the details of the parts encircled in FIG. 1 by the circle X.

The belt lock 8 illustrated in FIG. 3 which serves as belt release mechanism 7, includes a latching pawl 22 spring-loaded by a spring 21. The Bowden cable 9 engages at one end of the latching pawl 22 whose other end terminates in a button 23. If the door 14 is opened with a normal force, for example, for boarding the motor vehicle 2 whereby a pivoting of the door outer handle 12 about the point A (FIG. 2) occurs, then an unwinding of the belt band 24 takes place which cooperates by way of an eyelet 25 loosely with a loop generally designated by reference numeral 26—which connects the seat belt 4 with the shoulder belt 5. The seat belt system 3 moves away from the seat so that the passenger can board conveniently after swinging the door 14 outwardly. During the closing of the door 14, so much of the belt band 24 is wound up until the safety belt system 3 abuts under moderate prestress at the body of the user.

If an emergency occurs and the passenger is conscious, then, for example, with a blocked or jammed door 14, he is able to rapidly release the safety belt system 3 by pushing-in the button 23 at the belt lock 8 since during this operation the latching pawl 22 is displaced against the force of the spring 21 and finally becomes ineffectual.

However, if it is not possible for the passenger to free himself, then a pivot movement of the bell crank 20 can be brought about by a stronger pulling at the door outer handle 12 whereby an unlatching of the latching pawl 22 and therewith a release of the belt system 3 takes place from the outside of the vehicle by way of the Bowden cable 9 connected thereto. The belts now abut loosely at the body of the passenger and can be readily placed to one side so that nothing stands in the way any longer to a rapid recovery of the passenger.

If during an excessively strong opening of the door 14, the belt release mechanism should have been inadvertently actuated, then this is noticed immediately by the boarding person since the belts lie on the seat in a released condition. However, the complete functioning ability of the belt system can be rapidly reestablished by a simple insertion and engagement into the belt lock.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for the rapid release of a retaining system in vehicles with a vehicle body characterized in that at least one actuating means is provided at a readily accessible place of the vehicle body which includes means enabling the initiation of a release of the retaining system from the outside of the vehicle body, and in that the actuating means cooperates with an outside door handle means which is operatively connected with a belt release means and which, upon exceeding a predetermined actuating force acting on the same, initiates an unlatching of the belt release means.

2. An installation according to claim 1, characterized in that the belt release means includes a belt lock.

3. An installation according to claim 1, characterized in that a spring means is provided producing a force opposing the unlatching operation of the belt release means, linkage means operatively connected with outside door handle means, the spring means being received by a shaft of the linkage means and being supported, on the one hand, at the head portion of the linkage means and, on the other at a bracket means fixed at the vehicle and serving as guide means for the shaft.

4. An installation according to claim 3, characterized in that the bracket means is operatively connected with a bell crank and in that the bell crank is operatively connected at one end with the linkage means and at the other with a Bowden cable which is operatively connected with the belt release means.

5. An installation according to claim 4, characterized in that the actuation force necessary for the unlatching of the belt release means amounts to about five times the actuating force necessary for the opening of the door.

6. An installation according to claim 4, characterized in that the Bowden cable engages at a spring-loaded latching pawl of the belt lock of the belt release means which can also be moved manually in the sense of an unlatching of the belt release means by pressing-in an associated button.

7. An installation according to claim 6, characterized in that with a safety belt system including two belts, both belt strands are connected with each other by a loop in proximity to their point of displacement and are loosely connected with an eyelet.

8. An installation according to claim 7, characterized in that the safety belt system consists of a seat belt and of a shoulder belt.

9. An installation according to claim 8, characterized in that the retaining system is a passive safety belt system in motor vehicles.

10. An installation according to claim 9, characterized in that the readily accessible place of the body of the vehicle is a protected place.

11. An installation according to claim 10, characterized in that the actuation force necessary for the unlatching of the belt release means amounts to about five times the actuating force necessary for the opening of the door.

12. An installation according to claim 10, characterized in that a Bowden cable engages at a spring-loaded latching pawl of the belt lock of the belt release means which can also be moved manually in the sense of an unlatching of the belt release means by pressing-in an associated button.

* * * * *